United States Patent
Goto et al.

(10) Patent No.: US 7,905,503 B2
(45) Date of Patent: Mar. 15, 2011

(54) REAR VEHICLE BODY STRUCTURE

(75) Inventors: Mitsushige Goto, Wako (JP); Masateru Okano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 92 days.

(21) Appl. No.: 12/498,522

(22) Filed: Jul. 7, 2009

(65) Prior Publication Data

US 2010/0001502 A1    Jan. 7, 2010

(30) Foreign Application Priority Data

Jul. 7, 2008  (JP) ................................ 2008-177005

(51) Int. Cl.
*B62D 25/08* (2006.01)
(52) U.S. Cl. ............. 280/124.109; 296/193.07; 280/781
(58) Field of Classification Search .......... 280/124.109, 280/781, 788, 798, 800, 796; 296/193.07, 296/193.08
See application file for complete search history.

(56) References Cited

U.S. PATENT DOCUMENTS

| | | | | |
|---|---|---|---|---|
| 3,093,390 | A * | 6/1963 | Muller | 280/124.109 |
| 4,426,101 | A * | 1/1984 | Dyer | 280/788 |
| 5,036,943 | A * | 8/1991 | Kashiwagi | 180/380 |
| 5,074,587 | A * | 12/1991 | Schwede et al. | 280/781 |
| 6,070,904 | A * | 6/2000 | Ozaki et al. | 280/743.1 |
| 6,869,090 | B2 * | 3/2005 | Tatsumi et al. | 280/124.109 |
| 7,257,982 | B2 * | 8/2007 | Park | 72/398 |
| 7,516,968 | B2 * | 4/2009 | Cortez et al. | 280/124.116 |
| 7,770,964 | B2 * | 8/2010 | Herntier et al. | 296/193.01 |
| 2004/0155449 | A1 * | 8/2004 | Hashimura | 280/785 |
| 2009/0212522 | A1 * | 8/2009 | Stuart et al. | 280/124.109 |

FOREIGN PATENT DOCUMENTS

| | | |
|---|---|---|
| JP | 2000-006765 | 1/2000 |
| JP | 2000-168614 | 6/2000 |
| JP | 2002-347676 | 12/2002 |
| JP | 2005-104254 | 4/2005 |
| JP | 2005-119434 | 5/2005 |
| JP | 2006-160219 | 6/2006 |
| JP | 2006-240517 | 9/2006 |

* cited by examiner

*Primary Examiner* — Faye M. Fleming
*Assistant Examiner* — Drew Brown
(74) *Attorney, Agent, or Firm* — Rankin, Hill & Clark LLP

(57) ABSTRACT

A rear vehicle body structure includes left and right auxiliary members each connected at the front end to the underside of the respective left or right front floor frame and connected at the rear end to the respective left or right rear-suspension mounting section. Each of the left and right auxiliary members is generally in the form of a circular-section pipe and has a pipe section of a circular sectional shape and a flattened section formed on a front end portion of the pipe section. The flattened section has an upper surface portion flattened downwardly and has a lower surface portion having a central region flattened concavely upwardly along the axis of the auxiliary member.

3 Claims, 5 Drawing Sheets

REAR VEHICLE BODY STRUCTURE

FIELD OF THE INVENTION

The present invention relates to a rear vehicle body structure provided underneath a vehicle body floor and extending from rear end portions of left and right front floor frames to left and right rear frames.

BACKGROUND OF THE INVENTION

Among the conventionally-known rear vehicle body structures are ones where left and right side sills extend in a front-rear direction of the vehicle body, front floor frames are located inwardly of and extend in parallel to the side sills, and rear frames extend rearwardly from rear end portions of the side sills. In some of the known rear vehicle body structures, front and rear cross members etc. span between the left and right side sills to reinforce the side sills etc.

One example of such rear vehicle body structures is disclosed in Japanese Patent Publication No. 3528644, where the front floor frames are connected with the rear frames. More specifically, the rear vehicle body structure disclosed in the 3528644 publication includes: the left and right side sills extending in the front-rear direction of the vehicle body; the front floor frames located inwardly of and extend in parallel to the side sills; the rear frames extending rearwardly from rear end portions of the side sills; the front and rear cross members spanning between respective front end portions of the rear frames and between respective rear end portions of the front floor frames in a width direction of the vehicle; and reinforcing members each interconnecting the rear cross member and a central portion of the corresponding rear frame.

Because the reinforcing members are each connected to the rear end portion of the corresponding front floor frame, the rear vehicle body structure disclosed in the 3528644 publication would present the problem that, at the time of a rear-end collision, a collapsing load acts only on the rear end portions of the front floor frames so that the collapsing load can not be efficiently transmitted to and along the front floor frames. Further, in the rear vehicle body structure disclosed in the 3528644 publication, the reinforcing members connected in the aforementioned manner each extend diagonally downward from the corresponding rear frame to the rear end portion of the corresponding front floor frame as viewed in a side elevation; for this reason too, the collapsing load produced at the time of the rear-end collision can not be efficiently transmitted to and along the front floor frames.

SUMMARY OF THE INVENTION

In view of the foregoing prior art problems, it is an object of the present invention to provide an improved rear vehicle body structure which can achieve an increased rigidity of rear-suspension mounting sections and allows a load produced at the time of a rear-end collision to be efficiently transmitted the from rear frames to the front floor frames.

In order to accomplish the above-mentioned object, the present invention provides an improved rear vehicle body structure, which comprises: left and right front floor frames disposed in a generally central region of a vehicle body and extending in a front-rear direction of the vehicle body; left and right rear frames extending rearwardly from rear end portions of left and right side sills disposed on left and right sides of the vehicle body; left and right rear-suspension mounting sections fixed to front portions of the left and right rear frames, respectively, for mounting thereon left and right rear suspensions; and left and right auxiliary members each connected at a front end thereof to an underside of the left or right front floor frame and connected at a rear end to the left or right rear-suspension mounting section, each of the left and right auxiliary members being generally in the form of a circular-section pipe and having a pipe section of a circular sectional shape and a flattened section formed on a front end portion of the pipe section, the flattened section having an upper surface portion flattened downwardly and having a lower surface portion having a central region flattened concavely upwardly along the axis of the auxiliary member.

With each of the left and right auxiliary members connected at the front end to the underside of the corresponding front floor frame and connected at the rear end to the suspension mounting section, the rear vehicle body structure of the present invention allows a load, produced at the time of a rear-end collision, to be efficiently transmitted from the rear frames to and along the front floor frames. Because the load can be efficiently transmitted or dispersed from the rear frames to the front floor frames, each of sectional shape transition sections between the side sills and the rear frames can be constructed in a simplified manner. As a result, the rear vehicle body section of the vehicle can be reduced in weight.

Also, with each of the left and right auxiliary members connected at the front end to the underside of the corresponding front floor frame and connected at the rear end to the corresponding suspension mounting section, the rear vehicle body structure of the present invention can achieve an increased rigidity of the suspension mounting sections and thus achieve an enhanced maneuvering stability of the vehicle.

Further, because each of the left and right auxiliary members has the pipe section of a circular sectional shape and the flattened section formed on a front end portion of the pipe section, and because the flattened section has the upper surface portion flattened downwardly and has the lower surface portion having a central region flattened concavely upwardly along the axis of the auxiliary member, the present invention can effectively reduce an amount of downward projection, from the underside of the front floor frame, of the front end portion of the pipe-shaped auxiliary member.

In an embodiment, each of the left and right auxiliary members has a rear-end flat surface section formed on a rear end portion of the pipe section and vertically flattened in such a manner that the upper surface thereof lies generally flush with the upper surface of the pipe section, and each of the left and right auxiliary members also has a height-adjusting collar welded to the vertically flattened rear-end flat surface section. With this arrangement, the present invention can reduce undesired deflection and concentrated stress at and around the flattened rear-end flat surface section and thereby permits efficient transmission of a load at the time of a rear-end collision.

In an embodiment, the collar is supported in place by a bracket or stay member fixed to the pipe section. Thus, the collar can be mounted to the rear frame in a stable manner even where the collar has a relatively great height. As a result, the present invention permits an enhanced design freedom of, for example, the rear suspension mounting position.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
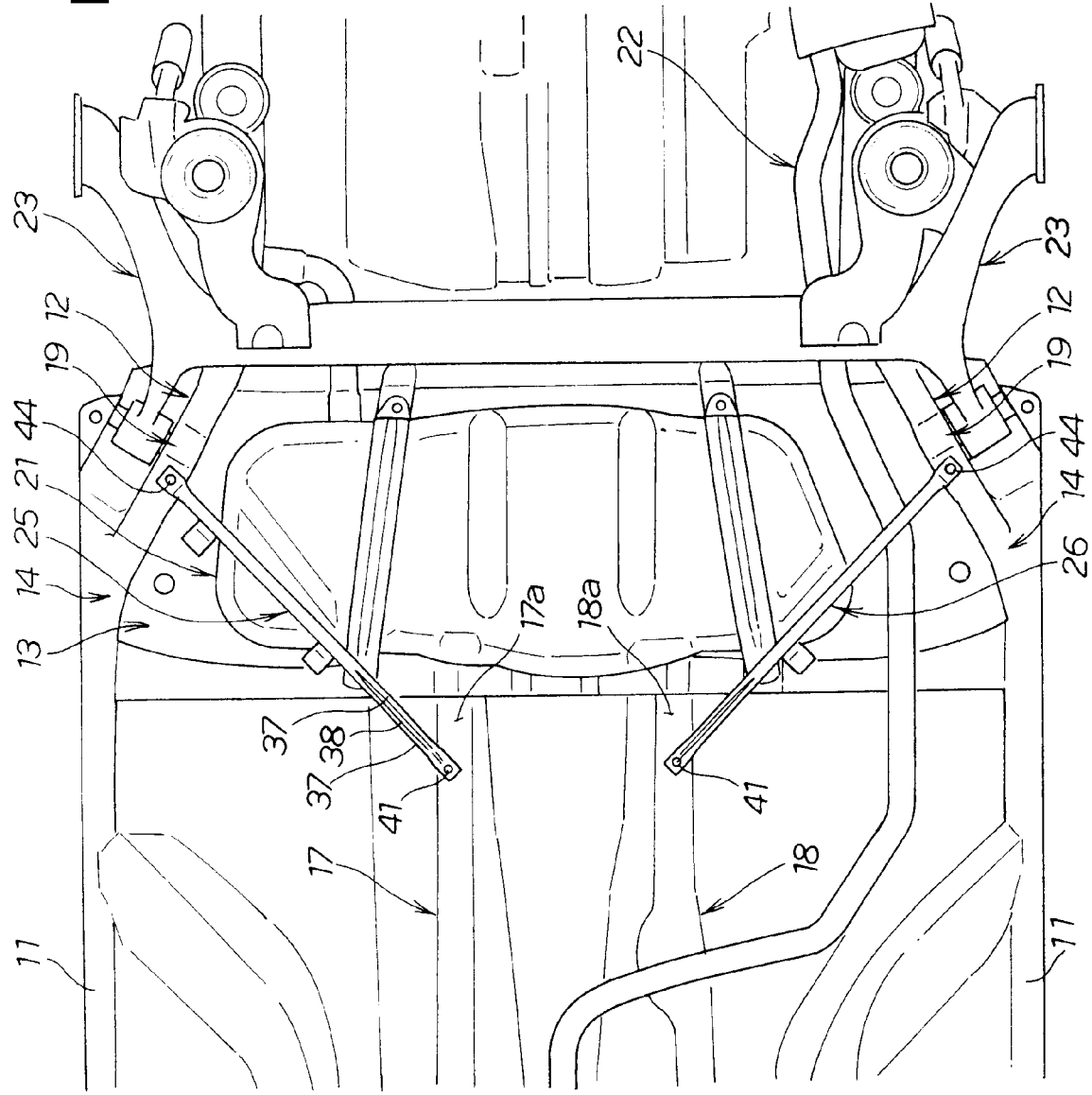
FIG. 1 is a bottom view of a rear vehicle body structure according to an embodiment of the present invention.
Figure 2:
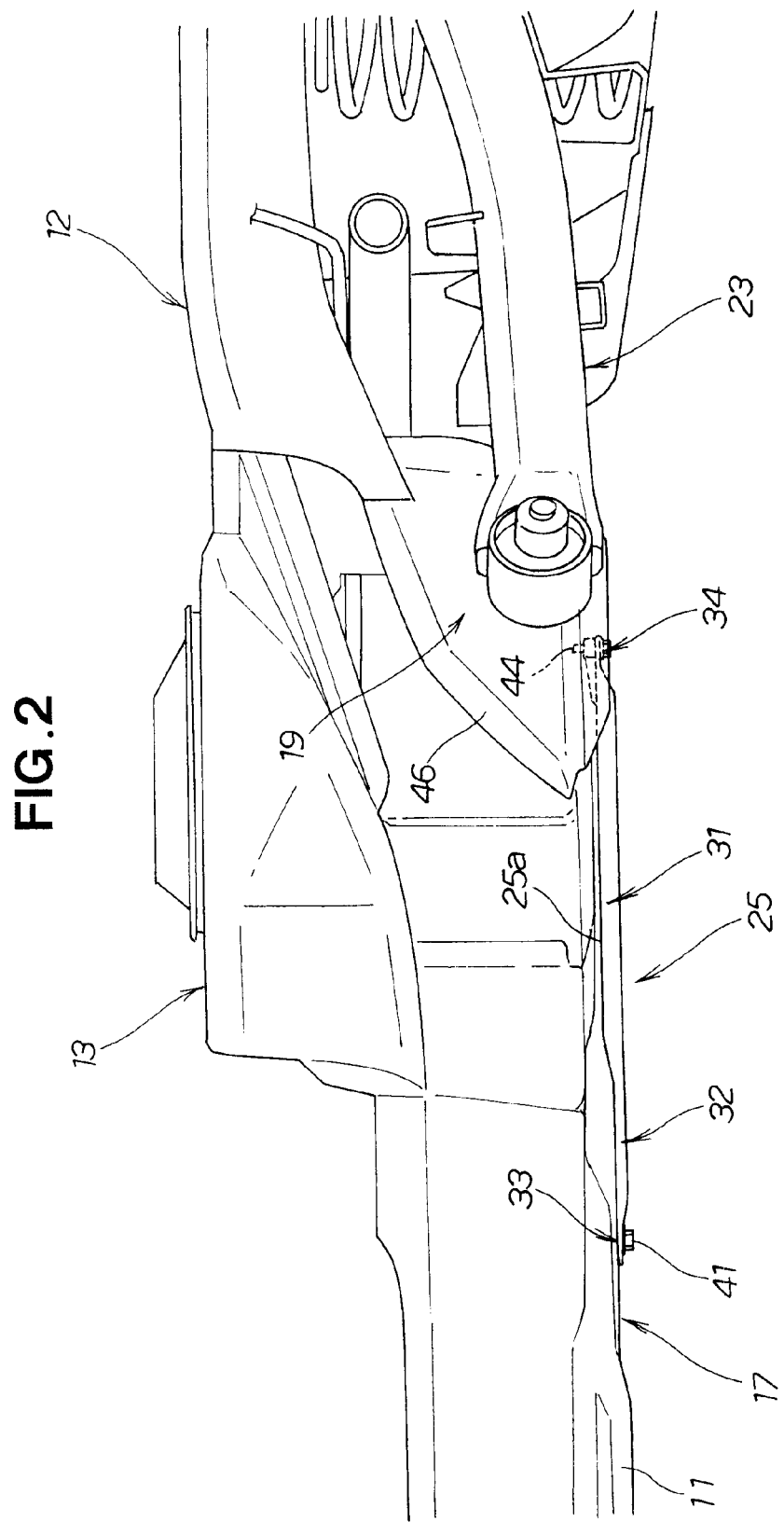
FIG. 2 is a side view of the rear vehicle body structure of FIG. 1.

Reference is now made to FIG. 1 which a bottom view of a rear vehicle body structure according to an embodiment of the present invention, and to FIG. 2 showing in side elevation the rear vehicle body structure of FIG. 1. As shown in FIGS. 1 and 2, the rear vehicle body structure comprises: left and right front floor frames 17 and 18 disposed in a generally central region of a vehicle body and extending in a front-rear direction of the vehicle body; left and right rear frames 12 extending rearwardly from rear end portions of left and right side sills 11 disposed on left and right sides of the vehicle body; left and right rear-suspension mounting sections 19 connected to on front end portions of the left and right rear frames 12, respectively, for pivotably mounting thereon left and right rear suspensions 23; and left and right auxiliary members (or brace members) 25 and 26 interconnecting the lower surfaces or undersides 17a and 18a of the left and right front floor frames 17 and 18 and the left and right rear-suspension mounting sections 19.

Fuel tank 21 is provided underneath a vehicle body floor 13 rearwardly of the left and right front floor frames 17 and 18 and forwardly of the rear suspensions 23. Exhaust pipe 22 is located under the vehicle body floor 13 and extends along the right side of the vehicle body. The left and right auxiliary members 25 and 26 are disposed in a generally V configuration extending gradually away from each other in a front-to-rear direction of the vehicle body. As viewed in a side elevation, the left and right auxiliary members 25 and 26 are mounted on the vehicle body so as to extend substantially horizontally.

Figure 3:
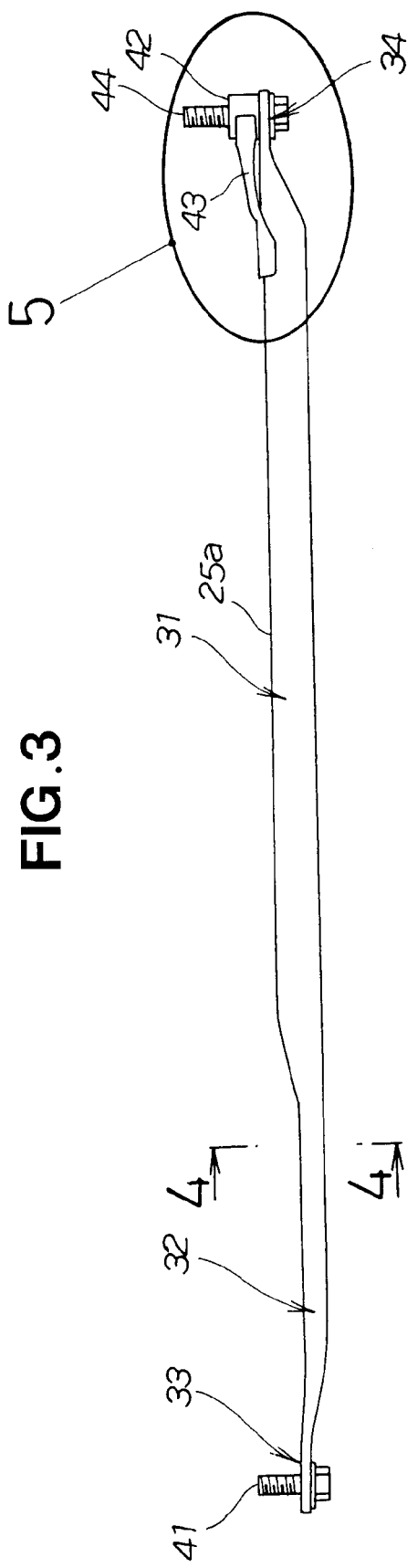
FIG. 3 is a side view of one of auxiliary members of the rear vehicle body structure of FIG. 1.
Figure 4:
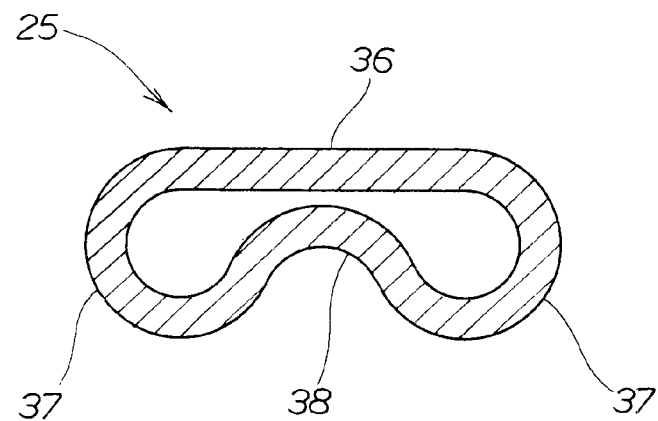
FIG. 4 is a sectional view taken along line 4-4 of FIG. 3.
Figure 5:
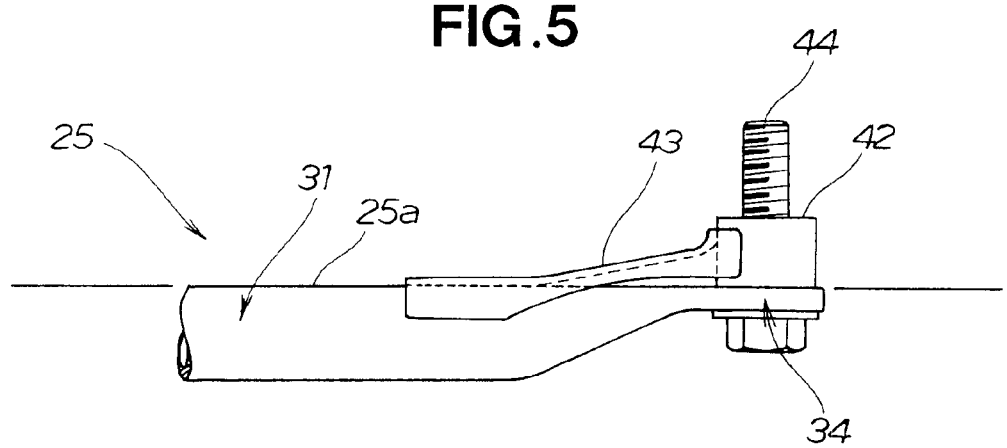
FIG. 5 is an enlarged view of a section encircled at 5 in FIG. 3.

FIG. 3 is a side view of one of the auxiliary members (left auxiliary member 25 in the illustrated example) of the rear vehicle body structure shown in FIG. 1, FIG. 4 is a sectional view taken along line 4-4 of FIG. 3, and FIG. 5 is an enlarged view of a section encircled at 5 in FIG. 3. As shown in FIG. 3, the auxiliary member 25 is generally in the form of a circular-section pipe. More specifically, the auxiliary member 25 includes: a pipe section 31 formed as a pipe having a circular sectional shape; a flattened section 32 of a formed on a front end portion of the pipe section 31 and having an upper surface portion flattened downwardly and having a lower surface portion having a central region flattened concavely upwardly along the axis of the pipe-shaped auxiliary member 25; a front-end connection section 33 formed continuously or integrally with the flattened section 32 and connected to the underside of the corresponding front floor frame 17; and a rear-end flat surface section 34 formed on a rear end portion of the pipe section 31 (and hence the auxiliary member 25) and flattened in such a manner that its upper surface lies generally flush with the upper surface 25a of the pipe section 31.

The flattened section 32, as shown in more detail in FIG. 4, integrally includes: an upper flat wall portion 36 having an upper surface located lower than the upper surface 25a of the pipe section 31; bulging portions 37 bulging downward from the opposite sides of the flat portion 36; and a central groove portion 38 formed by concavely upwardly flattening a central lower wall portion of the flattened section 32 (between the bulging portions 37) along the axis of the pipe-shaped auxiliary member 25. Namely, the flattened section 32 has a sectional shape substantially like a shape of swimming goggles, as seen in FIG. 4.

The front-end connection section 33 includes a bolt 41 for fastening the front-end connection section 33 to the underside of the corresponding front floor frame 17. As shown in FIG. 5, the rear-end flat surface section 34 includes: a height-adjusting collar 42 welded to the flattened rear-end flat surface section 34 adjacent to the suspension mounting section 19 for adjusting a relative height position between the rear-end flat surface section 34 and the suspension mounting section 19; a bracket 43 fixed to the pipe section 31 and disposed between the collar 42 and the pipe section 31 for preventing tumbling of the collar 42; and a bolt 44 for fastening the rear-end flat surface section 34 to the suspension mounting section 19.

Figure 6:
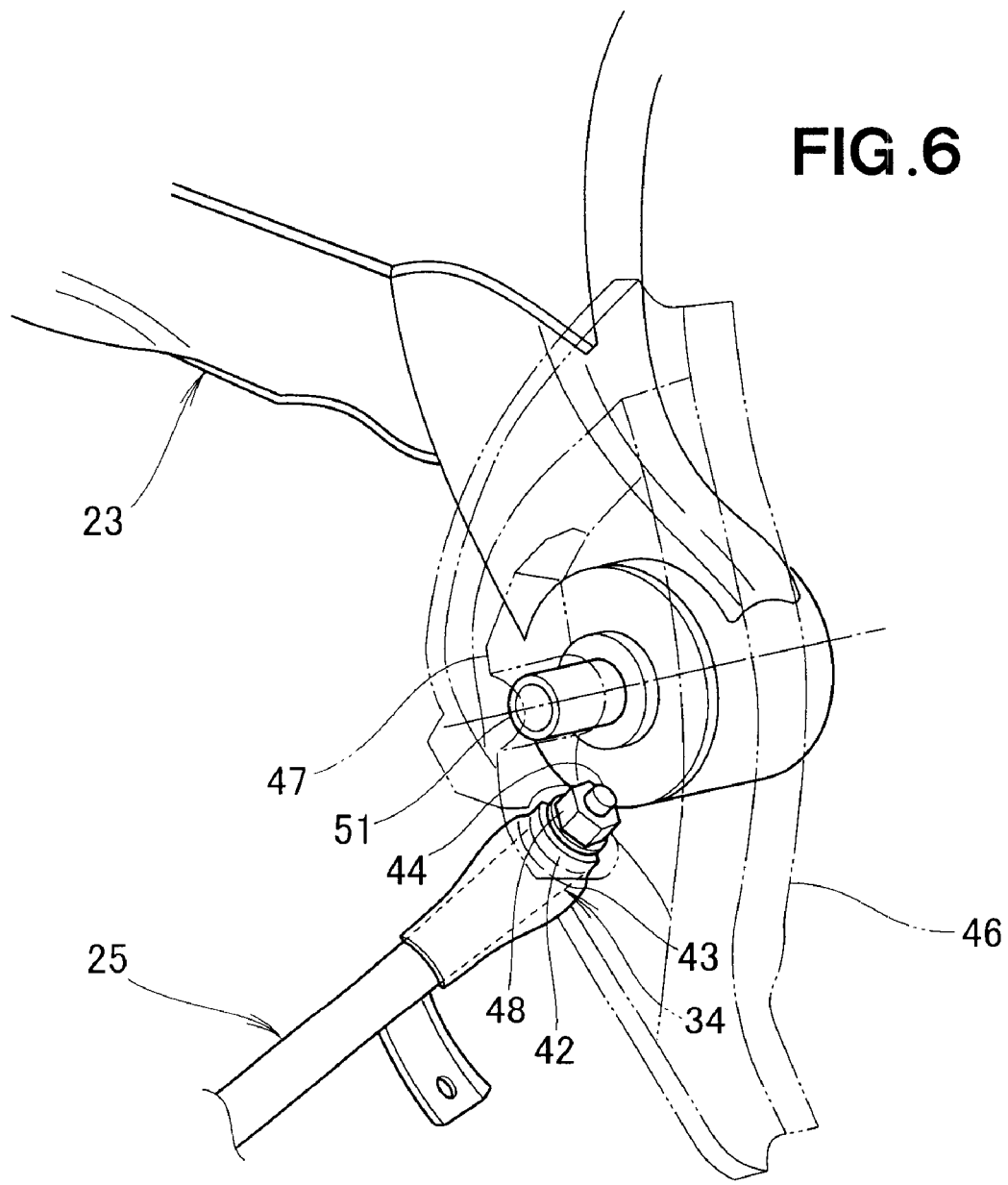
FIG. 6 is a perspective view of one of suspension mounting sections of the rear vehicle body structure of FIG. 1.

FIG. 6 is a perspective view of one of the suspension mounting sections (left suspension mounting section in the illustrated example) 19 of the rear vehicle body structure shown in FIG. 1. The suspension mounting section 19 includes: a suspension bracket 46 fixed to the corresponding rear frame 12; a bulkhead (supporting holder) 47 welded to the suspension bracket 46 for supporting a pivot shaft (collar nut) 51 of the rear suspension 23; and a nut 48 welded to the bulkhead 47 and having screwed therein a bolt 44 for fastening the rear-end flat surface section 34 of the auxiliary member 25 to the suspension mounting section 19.

Namely, the auxiliary member 25 interconnects the underside 17a of the front floor frame 17 (see FIG. 1) and the bulkhead 47 supporting the pivot shaft 51 of the rear suspension 23. Thus, the rear-end flat surface section 34 of the auxiliary member 25 can be fastened to the rear frame 12 with an increased strength and rigidity. As a result, the instant embodiment of the rear vehicle body structure can achieve an increased rigidity of the suspension mounting section 19 and thereby enhance the maneuvering stability of the vehicle.

Note that the right auxiliary member 26 is constructed in substantially the same manner as the above-described right auxiliary member 25.

The instant embodiment of the rear vehicle body structure, as described above with reference to FIGS. 1-6, comprises the left and right front floor frames 17 and 18 disposed in a generally central region of the vehicle body and extending in the front-rear direction of the vehicle body; the left and right rear frames 12 extending rearwardly from rear end portions of left and right side sills 11; the left and right rear-suspension mounting sections 19 provided on front portions of the right rear frames 12 for pivotably mounting thereon the left and right rear suspensions 23.

With each of the auxiliary members 25 and 26 connected at the front end to the underside 17a or 18a of the corresponding front floor frame 17 or 18 and connected at the rear end to the suspension mounting section 19, the instant embodiment of the rear vehicle body structure allows a load, produced at the time of a rear-end collision, to be efficiently transmitted from the rear frames 12 to and along the front floor frames 17 and 18. Namely, the load can be efficiently transmitted or dispersed to the front floor frames 17 and 18, and thus, each of connecting sections (or sectional shape transition sections) 14 between the side sills 11 and the rear frames 12, where there occurs a change or transition in sectional shape between the side sills 11 and the rear frames 12, can be constructed in a simplified manner. As a result, the rear vehicle body section of the vehicle can be reduced in weight.

Also, with each of the auxiliary members 25 and 26 connected at the front end to the underside 17a or 18a of the corresponding front floor frame 17 or 18 and connected at the rear end to the corresponding suspension mounting section 19, the instant embodiment of the rear vehicle body structure can achieve an increased rigidity of the suspension mounting section 19 and thus achieve an enhanced maneuvering stability of the vehicle.

Further, because the flattened section 32, formed on a front end portion of the pipe section 31 in each of the pipe-shaped auxiliary members 25 and 26, has its upper surface portion flattened downwardly and its lower surface portion flatted concavely upwardly at a central region along the axis of the pipe-shaped auxiliary member 25 or 26, the instant embodiment of the rear vehicle body structure can reduce an amount of downward projection, from the underside of the front floor frame 17 or 18, of the front end portion of the pipe-shaped auxiliary member 25 or 26. Thus, the front end portion of each of the pipe-shaped auxiliary members 25 and 26 can have an increased ground height (i.e., height from the ground surface) and an increased mechanical strength and rigidity.

Furthermore, because each of the pipe-shaped auxiliary members 25 and 26 has the rear-end flat surface section 34 formed on a rear end portion of the pipe section 31 and flattened in such a manner that its upper surface lies generally flush with the upper surface of the pipe section 31 and because the height-adjusting collar 42 is welded to the flattened rear-end flat surface section 34, the instant embodiment of the rear vehicle body structure can reduce undesired deflection and concentrated stress at and around the flattened section 34 and thereby permits efficient transmission of a load.

Furthermore, in the instant embodiment of the rear vehicle body structure, where the collar 42 is supported by the bracket 43, the collar 42 can be mounted to the rear frame 12 in a stable manner even where the collar 42 has a relatively great height. Thus, the instant embodiment of the rear vehicle body structure permits an enhanced design freedom of the mounting position of the rear suspension 23.

Furthermore, because each of the left and right auxiliary members 25 and 26 is disposed on the vehicle body to extend substantially horizontally as seen in FIG. 2, the instant embodiment of the rear vehicle body structure not only allows a load produced at the time of a rear-end collision to be efficiently transmitted from the rear frames 12 to and along the front floor frames 17 and 18, but also allows the floor of the vehicle to be provided at a lower position (i.e., can lower the height of the vehicle floor).

Further, whereas the instant embodiment of the rear vehicle body structure has been described above in relation to the case where each of the auxiliary members 25 and 26 interconnects the underside of the corresponding front floor frame and the bulkhead 47 supporting the pivot shaft 51 of the rear suspension 23, the present invention is not so limited, and each of the auxiliary members 25 and 26 may be constructed in any other suitable manner as long as it connects the underside of the front floor frame and the suspension mounting section 19.

Furthermore, whereas the instant embodiment of the rear vehicle body structure has been described above in relation to the case where each of the collars 42 is supported by the bracket 43, the present invention is not so limited, and each of the collars 42 may be supported by a stay member including a stay or a gusset.

The rear vehicle body structure of the present invention is well suited for application to passenger cars of a sedan type, wagon type, etc.

What is claimed is:

1. A rear vehicle body structure, comprising:
    left and right front floor frames disposed in a generally central region of a vehicle body and extending in a front-rear direction of the vehicle body;
    left and right rear frames extending rearwardly from respective rear end portions of left and right side sills disposed on respective left and right sides of the vehicle body;
    left and right rear-suspension mounting sections fixed to front portions of the left and right rear frames, respectively, for mounting thereon left and right rear suspensions; and
    left and right auxiliary members each connected at a front end thereof to an underside of the respective left or right front floor frame and connected at a rear end to the respective left or right rear-suspension mounting section, each of the left and right auxiliary members being generally in the form of a circular-section pipe and having a pipe section of a circular sectional shape and a flattened section formed on a front end portion of the pipe section,
    wherein the flattened section has an upper surface portion flattened downwardly and has a lower surface portion having a central region flattened concavely upwardly along an axis of the auxiliary member.

2. The rear vehicle body structure of claim 1, wherein each of the left and right auxiliary members has a rear-end flat surface section formed on a rear end portion of the pipe section and vertically flattened in such a manner that an upper surface thereof lies generally flush with an upper surface of the pipe section, and each of the left and right auxiliary members also has a height-adjusting collar welded to the vertically flattened rear-end flat surface section.

3. The rear vehicle body structure of claim 2, wherein the collar is supported in position by a bracket or stay member fixed to the pipe section.

* * * * *